Feb. 18, 1969   L. KRAUS ET AL   3,428,142
WHEEL SUSPENSION SYSTEM FOR MOTOR VEHICLES
Original Filed May 15, 1964

INVENTORS
LUDWIG KRAUS
FRIEDRICH H. VAN WINSEN
BY
*Dicke + Craig*
ATTORNEYS

INVENTORS
LUDWIG KRAUS
FRIEDRICH H. VAN WINSEN

BY
*Dicke + Craig*
ATTORNEYS

United States Patent Office 3,428,142
Patented Feb. 18, 1969

3,428,142
WHEEL SUSPENSION SYSTEM FOR
MOTOR VEHICLES
Ludwig Kraus, Wettstetten, near Ingolstadt, and Friedrich H. van Winsen, Kirchheim-Teck, Germany, assignors to Daimler-Benz Aktiengesellschaft, Stuttgart-Unterturkheim, Germany
Continuation of application Ser. No. 367,770, May 15, 1964. This application July 11, 1966, Ser. No. 564,434
U.S. Cl. 180—73     25 Claims
Int. Cl. B60k 17/00, 23/00

ABSTRACT OF THE DISCLOSURE

An indepedent swinging half-axle-type wheel suspension for the driven wheels of a motor vehicle utilizing pivoted guide arm structures carrying the wheels. An axial carrier is provided with a forward longitudinally resilient mounting the vehicle superstructure and rearward transversely resilient mountings to the vehicle superstructure. The wheel guide means are provided with forward thrust arms and obliquely arranged inclined guide arms mounted on pins attached to the axle carrier and having axes extending through oppositely disposed wheels and thrust arm superstructure mountings.

The present invention is a continuation of applicant's prior application Ser. No. 367,770, filed May 15, 1964, on a "Wheel Suspension," which is now abandoned.

Wheel suspensions for motor vehicles are known in the prior art in which the wheels, driven from an axle gear by means of transversely extending jointed shafts, are suspended on axle guide members which swing about an axis disposed transversely or obliquely to the driving direction; that is, in which so-called inclined guide members are utilized in the latter case. For the safe absorption of the forces and moments, the axle guide members are preferably constructed in a triangular or fork-shaped manner in that, for example, one guide arm is directed obliquely forwardly toward the vehicle center longitudinal axis, and a second guide arm is forwardly directed in proximity to the wheel approximately in the driving direction. Both guide arms are thereby supported on the vehicle superstructure, such as the frame or the supporting part of a self-supporting-type body construction within rubber joints.

The rubber cushions in these bearing joints, however, require a certain softness for the effective absorption of the shocks occurring at the wheels. This produces, even with a relatively wide bearing support of the guide arm, an angular displacement of the coordinated wheel in a horizontal plane with a given torque acting about a vertical axis. The wheel is deflected with corresponding angular movement out of the driving direction which produces an undesirable steering effect and impairs the driving safety.

The present invention aims, above all, to reduce this angular movement of the wheel, and essentially consists in that the axle guide members of both vehicle sides each carrying a wheel are supported at a common center axle carrier in such a manner that the axle carrier and both axle guide members form a system rigid or substantially rigid in a horizontal plane, the axle carrier in yieldingly suspended at the vehicle superstructure and the axle guide members are elastically supported against the vehicle superstructure in proximity to the wheels by lateral guide or thrust arms.

By reason of the fact that the axle carrier and axle guide members form a system rigid or at least nearly rigid in a horizontal plane; that is, that the right wheel, and the left wheel are connected with each other practically in an angularly stiff or corner-rigid manner by way of the axle guide members, there is achieved that with a one-sided or unilateral shock or impact on one of the two wheels the entire system can yield with a lever arm that corresponds to the entire wheel track of the wheels in that the system is supported at the vehicle superstructure on the two lateral thrust arms. By reason of this relatively large lever arm, the sterring deflection of the wheel is reduced with otherwise identical yieldingness in the driving direction so that the steering deflection can be neglected or disregarded for the practical driving operation with a suspension according to the present invention.

Constructions are already known in which the wheels are supported by means of inclined guide arms at a separate auxiliary frame which in turn is elastically supported from the vehicle superstructure and which also elastically carries, for example, the axle gear housing. In this case, the occurring forces and moments are absorbed with a large lever arm at the connecting places between the auxiliary frame and the vehicle superstructure; however, this prior art construction requires a separate auxiliary frame as additional stuctural part.

Preferably, according to a further feature of the present invention, the axle carrier is elastically connected with the vehicle superstructure in such a manner that there exists a yieldingness principally only in a horizontal plane, especially in the vehicle tranverse direction and in the vehicle longitudinal direction, but no yieldingness or only a slight yieldingness about a vehicle longitudinal axis.

In a particularly preferred embodiment of the present invention, the axle gear housing is used as axle carrier. The axle guide arm, especially inclined guide member, is thereby appropriately supported by means of lateral joints at the forward end of the axle gear housing whereas the rear end of the housing is supported on the vehicle superstructure, for example, by a transverse girder or cross traverse in such a manner that a movement in made possible principally only in the transverse direction. The transverse girder or cross traverse may be constructed also elastically transverselly to the main dimension thereof, that is, elastically also in the driving direction—approximately in the manner of a leaf spring—so that with simultaneous corresponding bearing support of the axle carrier at the other end thereof, the axle carrier can yield as a unit, in addition to the yielding thereof in the transverse direction, also in the vehicle longitudinal direction within the provided elasticity.

The axle guide arms, especially inclined guide members, are supported as rigidly as possible at the axle carrier. Appropriately, roller bearings serve for that purpose, though possibly also rubber bushings may be provided which, however, are relatively hard in the radial direction so that the requisite corner stiffness or angular rigidity between the axle carrier and the axle guide arm in a horizontal plane is assured.

Possibly the axle guide arms may also be supported on an intermediate member which is pivotally connected with the axle carrier about a vertical axis.

The lateral thrust arms which are rigidly or pivotally connected with the axle guide arm, especially with the inclined guide member, may be supported from the vehicle superstructure in a relatively soft manner since also with large yieldingness in the support places, the angular movement of the wheel is only slight. Possibly, the lateral thrust arms may be constructed also yielding in themselves or as simple rods; in case of driving shocks or impacts conducted against the wheel from in front thereof, the lateral thrust arms are loaded essentially in tension, whereas the thrust forces transmitted to the wheels during starting of the vehicle are transmitted by way of the axle guide arm or inclined guide member to the axle carrier; that is, especially to the axle gear housing.

Accordingly, it is an object of the present invention to provide a wheel suspension of the type described above which eliminates by simple means, the aforementioned drawbacks and shortcomings encountered with the prior art constructions.

Another object of the present invention resides in the provision of an independent wheel suspension, especially for the driven wheels of a motor vehicle, which minimizes the steering deflections of the wheels, notwithstanding great simplicity of the suspension.

Still another object of the present invention resides in the provision of an independent wheel suspension of the swinging half-axle type in which the shocks and impacts occurring at the wheels may be absorbed relatively softly and elastically without, however, involving large steering deflections during movements of the wheels.

Another object of the present invention resides in the provision of an independent wheel suspension of the type described above, in which the driving safety is considerably improved without sacrificing the good characteristics and properties of the suspension to absorb relatively softly road shocks transmitted by way of the wheels.

Still another object of the present invention resides in the provision of an independent wheel suspension, especially for the driven wheels of motor vehicles, which forms an at least approximately corner-rigid suspension system, capable of yielding relatively softly in a horizontal plane while substantially preventing swinging movements of the wheel suspension about a vehicle longitudinal axis.

A further object of the present invention resides in the provision of a wheel suspension of the type described above in which the entire system is able to yield with a relatively large lever arm corresponding essentially to the entire wheel track of the wheels, yet prevents or at least substantially minimizes the steering deflections of the wheels.

Still another object of the present invention resides in the provision of an independent wheel suspension of the type described above which utilizes relatively few parts to achieve the aims and objects mentioned above, which may be readily assembled and disassembled and which, in particular, obviates the need for an auxiliary frame.

These and other objects, features and advantages of the present invention will become more obvious from the following description when taken in connection with the accompanying drawing which shows, for purposes of illustration only, several embodiments in accordance with the present invention, and wherein FIGURE 1 is a schematic plan view of a wheel suspension arrangement in accordance with the present invention, indicated only schematically, and provided with inclined guide arms pivotally supported directly at a center axle carrier;

Figure 1:
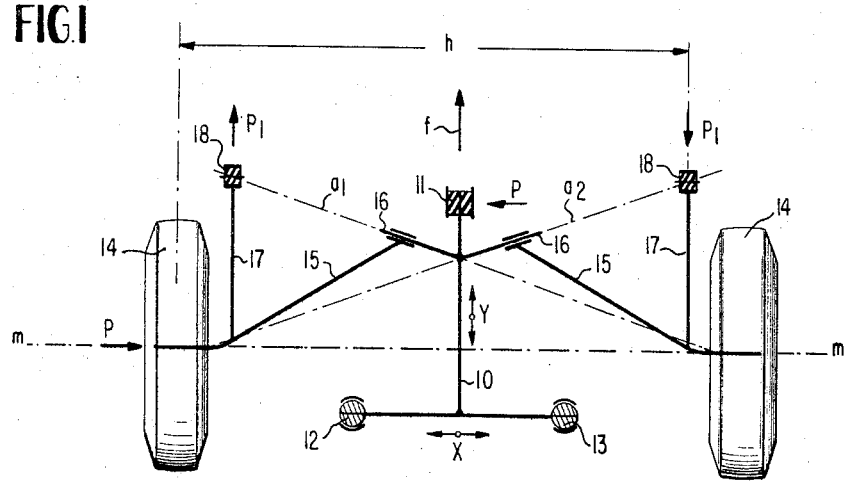

Referring now to the drawing wherein like reference numerals are used throughout the various views to designate like parts, and more particularly to FIGURE 1, the axle carrier or axle bearer 10 illustrated in this figure which may be formed, for example, by the axle gear housing, is elastically secured at the vehicle superstructure (not shown) in three points 11, 12 and 13. The vehicle superstructure may be in the form of a vehicle frame or of analogous parts of the body of a self-supporting-type body construction. The rubber cushions provided in the three bearing points 11, 12 and 13 and preferably arranged and constructed in such a manner that the bearing point 11 permits a yielding of the axle carrier 10 principally in the longitudinal direction $y$ while the bearing points 12 and 13 permit a yielding of the axle carrier 10 principally in the vehicle transverse direction $x$ so that the yieldingness between the axle carrier 10 and the vehicle superstructure exists altogether in a horizontal plane, principally however in the directions $x$ and $y$ whereas the yieldingness about the vehicle longitudinal axis is relatively slight.

The axle guide arms or inclined guide members 15 carrying the wheels 14, especially driven rear wheels, are pivotally supported, preferably secured against axial displacement, on pins 16 which are rigidly connected with the axle carrier 10 and which determine inclined swinging axes $a_1$ and $a_2$ for the axle guide arms. The swinging axes extend from the associated wheel obliquely toward the rear to the oppositely disposed wheel so that the swinging axes intersect the vertical vehicle transverse plane $m$—$m$ containing the center axes of the wheels approximately within the area of the respective oppositely disposed wheel. The pins 16 and associated pivotal connection of the guide members 15 thereby provide the means along with the axle carrier 10 for suspending the axle guide arms from the vehicle superstructure providing swinging axes extending at an angle to the driving direction of the vehicle.

Each of the two inclined guide members 15 is supported against the vehicle superstructure in proximity of the wheel carried thereby by a thrust arm 17 whereby the thrust arm 17 in its turn is pivotally and elastically connected at the vehicle superstructure in a point 18. The rubber cushions provided in the joints 18 may be constructed in a relatively soft manner.

If a transverse force P occurs, for example, at the left wheel 14, then the axle system which consists of the axle carrier 10 and of the inclined guide members 15 supported thereon rigidly in a horizontal plane, seeks to rotate about a vertical axis. There results therefrom at the axle system in the bearing points thereof, and more particularly with the described construction of the individual bearing points, a resultant counter force P of identical magnitude effective principally in the point 11 so that a torque is produced which is kept in equilibrium by a counter torque produced by the forces $P_1$ which act principally in the support points 18 of the lateral thrust arms 17 between the vehicle axle and the vehicle superstructure. The left thrust arm 17 is thereby loaded in tension and the right arm 17 in compression. The right support point 18 acts approximately as point of rotation for the system consisting of the parts 15 and 17 in that the left wheel 14 seeks to pivot about this point with a lever arm $h$ which corresponds approximately to the entire wheel track. The steering deflection of the wheel 14 is therefore only very slight. The axle carrier 10 can follow these movements without difficulties by reason of its principal or main yieldingness in the direction of arrows $x$ and $y$.

Similar conditions as with transverse forces also occur with one-sided longitudinal forces.

Figure 2:
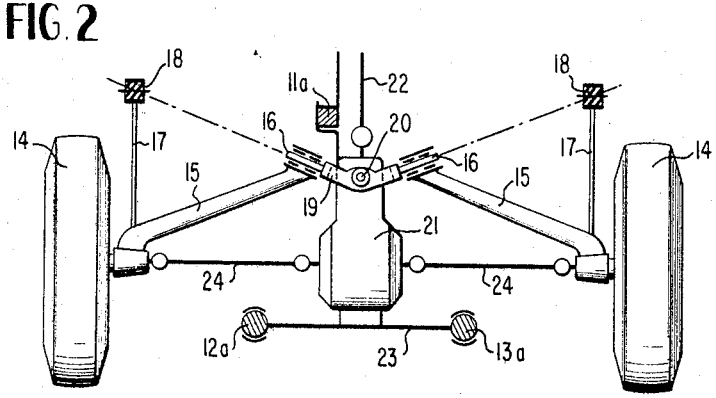
FIGURE 2 is a schematic plan view of a modified embodiment of a wheel suspension in accordance with the present invention, similar to FIGURE 1, in which the axle guide arms are supported at an intermediate member pivotally connected with the axle carrier.
Figure 3:
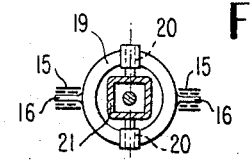
FIGURE 3 is a partial elevational view, on an enlarged scale, of the intermediate member of FIGURE 2, together with the bearing support of the axle guide arms at the intermediate member and the pivotal connection thereof at the axle gear housing.

The construction of the embodiment according to FIGURES 2 and 3 differs from that of FIGURE 1 essentially in that the inclined guide members 15 are supported on pins 16 which form part of an intermediate member 19 which in turn is pivotally connected about pins 20 having a vertical axis at the axle carrier; that is, an axle gear housing 21 and surrounds in an annular-shaped manner, the axle gear housing 21 in a vertical transverse plane. The axle gear housing 21, in turn, is elastically supported on the vehicle superstructure, on the one hand, in proximity to the pivotal connection of the intermediate member 19 in a forward bearing point 11a, for example, laterally of the drive shaft 22 of the transmission, and in two bearing points 12a and 13a by means of a transverse girder or cross traverse 23 secured at the housing 21. The wheels are driven from the axle gear by double-jointed shafts 24. Thrust arms 17 support the system consisting of the intermediate member 19 and the inclined guide members 15, which is rigid in a horizontal plane, against the vehicle superstructure in soft rubber elements 18.

Figure 4:
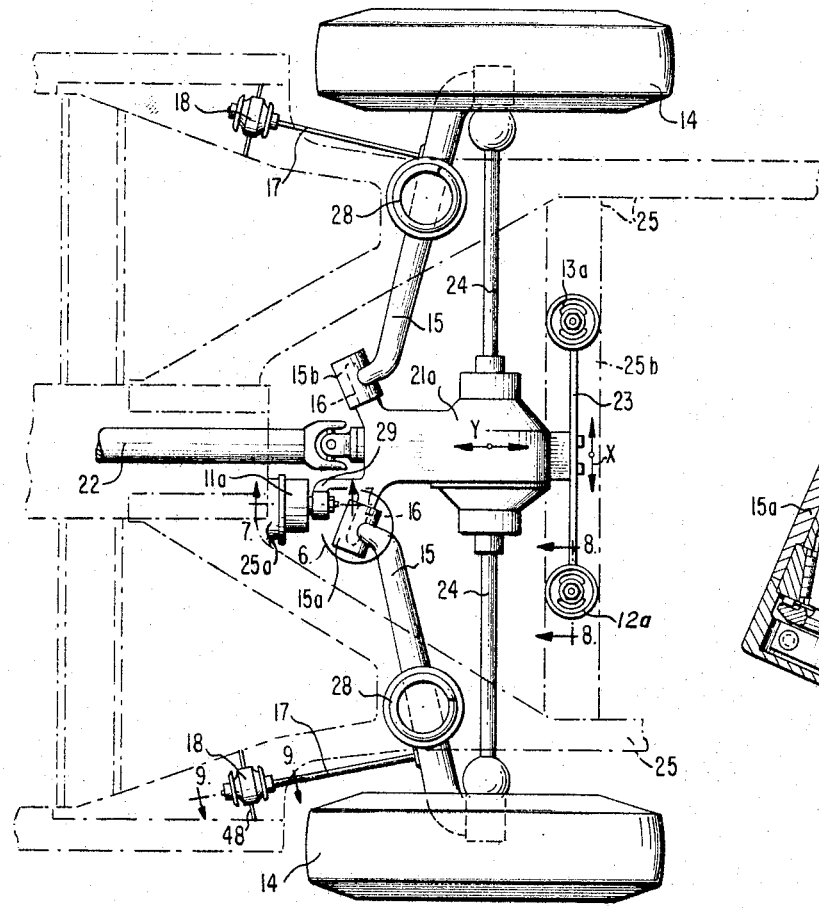
FIGURE 4 is a partial plan view of a wheel suspension for a motor vehicle in accordance with the present invention, approximately corresponding to FIGURE 1.
Figure 6:
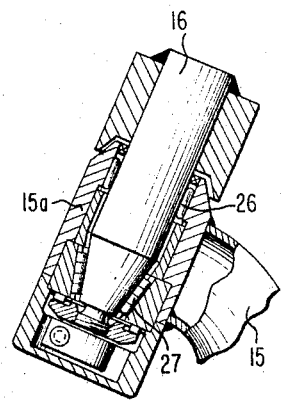
FIGURE 6 is a partial cross-sectional view, on an enlarged scale, and showing the details encircled by circle 6 in FIGURE 4.
Figure 5:
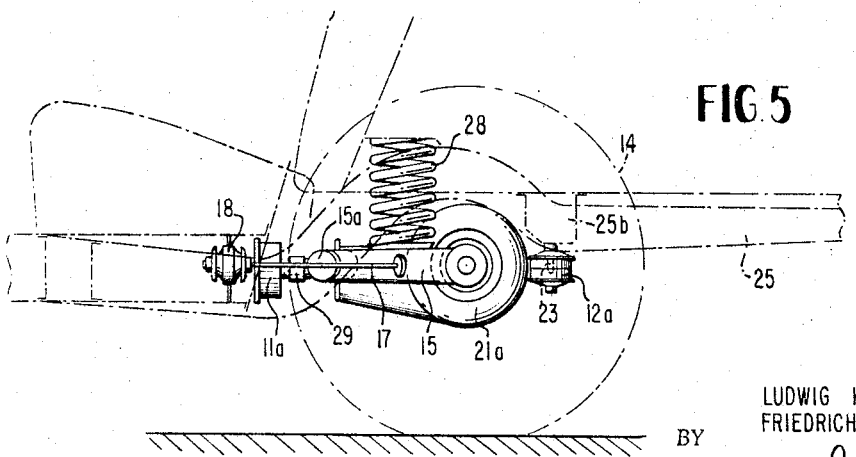
FIGURE 5 is a partial side elevational view of the wheel suspension of FIGURE 4.

A constructional embodiment of the present invention approximately corresponding to FIGURE 1, is illustrated in FIGURES 4 to 6, whereby an axle gear housing 21a similar to FIGURE 2 serves in this embodiment as axle carrier. The axle gear housing 21a is, as in FIGURE 2, suspended at three points 11a, 12a and 13a from the vehicle superstructure 25 in such a manner that it can yield principally, on the one hand, in the transverse direction $x$ in the transverse plane of the two points 12a and 13a and, on the other, in the longitudinal direction $y$ approximately in the longitudinal center plane of the vehicle.

At the forward end of the gear housing 21a in proximity to the support point 11a, the gear housing 21a is provided with pins 16 on which are supported, in a corner-rigid and frictionless manner, the inclined guide structures 15, secured against axial displacement, by means of bearing eyes 15a and needle or roller bearings 26 and 27. The inclined guide structures 15 carrying the wheels 14, in turn, are supported elastically in a relatively soft manner at the vehicle superstructure at 18 by means of thrust arms 17. The thrust arms 17 are constructed, for example, as simple rods and are rigidly connected with the inclined guide arms 15. The inclined guide arms 15 are spring-supported against the vehicle superstructure 25 in the main spring direction of the wheels by means of coil springs 28 or similar spring elements.

The drive of the rear wheels 14 takes place, for example, from a forwardly disposed driving engine by way of a cardan drive shaft 22, the axle gear accommodated within the axle gear housing 21a and the double-jointed shafts 24.

The axle system, together with the inclined guide members 15 is thus elastically supported by way of the axle gear housing 21a in the three points 11a, 12a and 13a from the vehicle superstructure in a horizontal plane, especially is elastically suspended so as to be displaceable in the longitudinal and transverse direction, and additionally is elastically supported by the thrust arms 17 in the driving direction in the two points 18.

Figure 7:
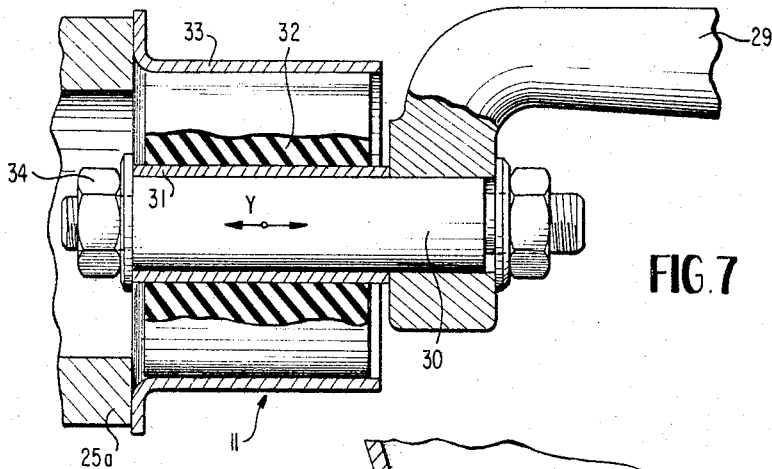
FIGURE 7 is a cross-sectional view through the forward elastic suspension of the axle gear housing serving as axle carrier according to FIGURES 4 and 5, and taken along line 7—7 of FIGURE 4.
Figure 8:
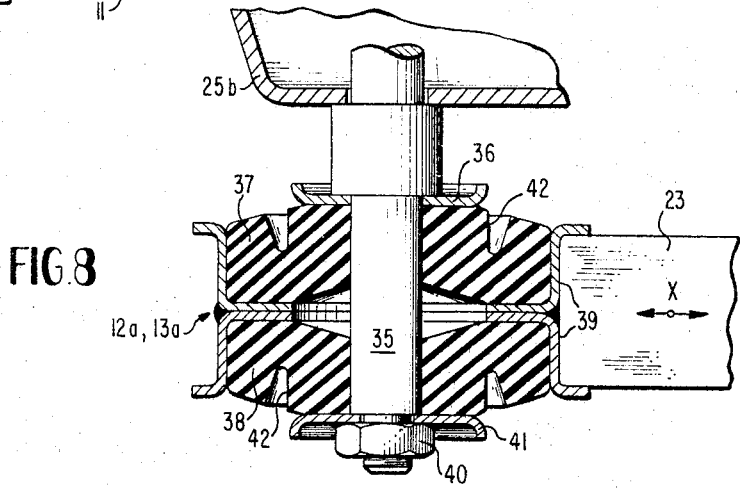
FIGURE 8 is a cross-sectional view through a rearward elastic suspension of the axle gear housing taken along line 8—8 of FIGURE 4.
Figure 9:
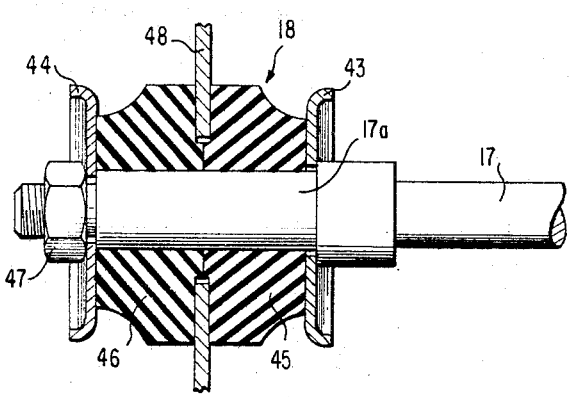
FIGURE 9 is a cross-sectional view through the elastic support of the guide or thrust arm, taken along line 9—9 of FIGURE 4.

FIGURES 7 to 9 show exemplary embodiments of the suspension and support points used in the embodiment of FIGURES 4 through 6.

FIGURE 7 is a cross section through the forward suspension point 11a of FIGURES 4 and 5. A bearing bolt 30 is securely inserted into the bore of an arm 29 securely connected with the axle gear housing 21a. The rubber bushing 32 is slipped over the bearing bolt 30 by means of an inner metal bushing 31. The rubber bushing 32 in turn is threadably connected by means of an outer metal bushing 33 at a part 25a of the vehicle superstructure 25. The rubber bushing 32 is rigidly connected by vulcanizing with the metal bushings 31 and 33, whereby the bushing 31 is secured on the bearing bolt 30 in the axial direction by a nut 34. As may be seen from FIGURE 7, the rubber bushing 32 provides a yieldingness principally in the vehicle longitudinal direction $y$ whereby it is subjected essentially to shearing loads or stresses.

One of the rear bearing points 12a and 13a is shown in FIGURE 8. A bearing bolt 35 is securely inserted into a cross bearer 25b of the vehicle superstructure. Two rubber rings 37 and 38 are slipped over the bearing bolt 35 by interposition of a pressure disk 36. The rubber rings 37 and 38 receive therebetween a bearing eye 39 consisting of two dish-shaped sheet metal elements welded together and disposed at the end of the cross bearer 23. The rubber rings 37 and 38 are thereby held axially under stress by means of a nut 40 under interposition of a pressure disk 41. In order to increase the yieldingness in a horizontal plane or in the transverse direction of the vehicle, the rubber rings 37 and 38 may possibly be provided with aperture 42.

One of the support points 18 is illustrated in cross section in FIGURE 9. The rubber cushions 45 and 46 are clamped onto the end 17a of the guide or thrust arm 17 between the two pressure disks 43 and 44, whereby the pressure disk 44 is axially supported by a nut 47. The rubber cushions 45 and 46 are pressed from opposite sides against a disk-shaped wall 48 which is rigidly secured at the vehicle superstructure, for example, is welded to the frame thereof.

We claim:

1. An axle suspension for motor vehicles having a superstructure comprising:
   common centrally disposed axle carrier means,
   axle guide means on both sides of the vehicle, each axle guide means carrying a respective wheel,
   first means for suspending said axle guide means from said axle carrier means and operatively connecting said axle guide means with said axle carrier means,
   second means for yieldingly suspending said axle carrier means from said vehicle superstructure, third means provided with laterally spaced thrust arm means for elastically supporting the axle guide means on the vehicle superstructure in proximity to the wheels,
   said first means, said third means, said axle carrier means, and said axle guide means forming a rigid structure in a substantially horizontal plane said second means including a transversely extending support means for suspending said axle carrier means from the vehicle superstructure at one end thereof yieldingly in the transverse vehicle direction and elastic cushion means having a principal yieldingness in the vehicle longitudinal direction for suspending the other end of said axle carrier means from said vehicle superstructure.

2. An axle suspension for motor vehicles according to claim 1 wherein, said transversely extending support means is constructed in the manner of a leaf-spring and produces a yieldingness of the axle carrier means supported thereby in the vehicle longitudinal direction.

3. An axle suspension for motor vehicles according to claim 1, wherein said axle carrier means one end is the rearward end and said axle carrier means other end is the forward end.

4. An axle suspension for motor vehicles having a superstructure comprising:
   common centrally disposed axle carrier means,
   axle guide means on both sides of the vehicle, each axle guide means carrying a respective wheel,
   first means for suspending said axle guide means from said axle carrier means and operatively connecting said axle guide means with said axle carrier means,
   second means for yieldingly suspending said axle carrier means from said vehicle superstructure, third means provided with laterally spaced thrust arm means for elastically supporting the axle guide means on the vehicle superstructure in proximity to the wheels, said first means, said third means, said axle carrier means, and said axle guide means forming a rigid structure in a substantially horizontal plane, said second means including rubber bushing means stressed in shear in the axial direction thereof and having an axis extending substantially in the vehicle longitudinal direction for suspending the forward end of said axle carrier means from said vehicle superstructure such that said axle carrier means, said axle guide means, and said first, second and third means are yieldable as a structural unit in the vehicle longitudinal direction, said second means further including rubber ring means having a relatively large diameter and substantially vertical axis for suspending said axle carrier means from two rear bearing points such that said axle carrier means is yieldable in the vehicle transverse direction, said rubber ring means being clamped in the axial direction and being provided with aperture means to increase the yieldability of said axle carrier means, and said first, second and third means in the vehicle transverse direction, said first means, said third means and said rubber bushing means being located forward of a vertical vehicle lateral plane extending through the wheel centers, and said rubber ring means being located in back of said vertical vehicle lateral plane.

5. An axle suspension for motor vehicles, especially the driven wheels of a motor vehicle having a superstructure, comprising:

common centrally disposed axle carrier means constituted by the axle gear housing, axle guide means on both sides of the vehicle, each axle guide carrying a respective wheel, first means providing inclined swinging axes each extending obliquely to the vehicle driving direction from an associated wheel to the oppositely disposed wheel such that said swinging axes intersect a vertical vehicle transverse plane extending through the wheel centers within an area of the oppositely disposed wheel, said first means operatively connecting said axle guide means with said axle carrier means, second means for yieldingly suspending said axle carrier means from said vehicle superstructure for movement substantially only in the vehicle horizontal plane, third means having laterally spaced thrust arm means for elastically supporting said axle guide means on the vehicle superstructure in proximity to the wheels, said first means, said third means and said axle guide means forming a rigid structure in a substantially horizontal plane, and shaft means extending from said axle gear housing to each of said respective wheels for driving said wheels.

6. An axle suspension for motor vehicles according to claim 5 wherein, said first means includes a pivotal member mounted to said axle carrier means to be pivotal about a vertical vehicle axis and for connecting said axle guide means to said axle carrier means, and said shaft means is constituted by a double-jointed shaft for driving the wheels from said axle gear housing.

7. An axle suspension for motor vehicles according to claim 6 wherein, said first means further includes lateral obliquely disposed bearing means for the pivotal bearing support of said axle guide means, said bearing means being provided at the forward end of said axle carrier means.

8. An axle suspension for motor vehicles according to claim 7 wherein, said second means includes rubber bushing means loaded in shear in the axial direction and having an axis extending in the vehicle longitudinal direction for suspending the forward end of said axle carrier means from said vehicle superstructure, rubber ring means having a relatively large diameter and vertical axis for suspending the axle carrier means at two rearward bearing points, said rubber ring means being axially clamped and provided with aperture means, and said third means including two rubber cushion means which are supported in the vehicle longitudinal direction from opposite sides against a part arranged on the vehicle superstructure.

9. An axial suspension for motor vehicles according to claim 7 wherein, said second means includes a transversely extending support means for suspending one end of said axle carrier means from the vehicle superstructure yieldingly in the transverse direction and elastic cushion means having a principle yieldingness in the vehicle longitudinal direction for suspending the other end of said axle carrier means from said vehicle superstructure, said transversely extending support means being constructed in the manner of a leaf-spring.

10. An axle suspension for motor vehicles according to claim 5 wherein, said second means includes transversely extending support means for suspending one end of said axle carrier means from the vehicle superstructure yieldingly in the transverse direction and elastic cushion means having a principal yieldingness in the vehicle longitudinal direction for suspending the other end of said axle carrier means from said vehicle superstructure.

11. An axle suspension for motor vehicles according to claim 10, wherein said transversely extending support means is constructed in the manner of a leaf-spring to produce a yieldingness of the axle carrier means supported thereby in the vehicle longitudinal direction.

12. An axle suspension for motor vehicles according to claim 11, wherein said first means includes lateral obliquely disposed bearing means for the pivotal bearing support of said axle guide means provided at the forward end of said axle carrier means in the proximity of said elastic cushion means.

13. An axle suspension for motor vehicles, especially for the driven wheels of motor vehicles having a superstructure, comprising:

common centrally disposed axial carrier means, inclined axle guide means on both sides of the vehicle, each axle guide means carrying a respective wheel, first means for operatively connecting said axle guide means with said axle carrier means, second means for yieldingly suspending said axle carrier means from said vehicle superstructure, third means for elastically supporting the axial guide means on the vehicle superstructure, said axle guide means, said axle carrier means, and said first, second and third means forming an approximately rigid structure in a substantially horizontal plane, said first means providing inclined swinging axles each extending obliquely to the vehicle driving direction from a point on the vehicle superstructure from which said third means elastically supports said axle guide means to the oppositely disposed wheel such that said swinging axes intersect a vertical transverse plane extending through the wheel centers within an area of the oppositely disposed wheel, said first means and said third means being located forward of said vertical vehicle transverse plane.

14. An axle suspension for motor vehicles having a superstructure, comprising:

common centrally disposed axle carrier eans, axle guide means on both sides of the vehicle, each axle guide means carrying a respective wheel, first means for suspending said axle guide means to provide swinging axes extending at an angle to the driving direction of the vehicle and operatively connecting said axle guide means with said axle carrier means so as to form an approximately rigid system in an approximately horizontal plane, second means for yieldingly suspending said axle carrier means from said vehicle superstructure, and third means having laterally spaced thrust arm means for elastically supporting the axle guide means on the vehicle superstructure in proximity to the wheels.

said second means including a transversely extending support means connected yieldingly in the transverse direction at both ends thereof for suspending said axle carrier means from the vehicle superstructure at one end thereof, and elastic cushion means having principal yieldingness in the vehicle longitudinal direction for suspending the other end of said axle carrier means from said vehicle superstructure, sad transversely extending support means being constructed in the manner of a leaf-spring and producing a yieldingness of the axle carrier means supported thereby in the vehicle longitudinal direction.

15. An axle suspension for motor vehicles having a superstructure, comprisin:
common centrally disposed axle carrier means constituted by the axle gear housing,
axle guide means on both sides of the vehicle, each axle guide means carrying a respective fheel,
first means for suspending said axle guide means to provide swinging axes extending at an angle to the driving direction of the vehicle intersecting each other forwardly of the wheel centers and operatively connecting said axle guide means with said axle carrier means so as to form an approximately rigid system in an approximately horizontal plane changes due to suspension movements, second means for yieldingly suspending said axle carrier means from said vehicle superstructure, and third means having laterally spaced thrust arms for elastically supporting the axle guide means on the vehicle superstructure in proximity to the wheels,
the axle gear housing serving as axle carrier means being provided at the forward end thereof with lateral obliquely disposed bearing means for the pivotal bearing support of the axle guide means forming part of the first means and forming the sole suspension connection between said axle carrier means and said axle guide means.

16. An axle suspension for motor vehicles according to claim 15, wherein said first means includes roller bearing means for supporting said axle guide means on said axle carrier means.

17. An axle suspension for motor vehicles according to claim 15, wherein said first means includes radially relatively hard rubber bushing means for supporting said axle guide means on said axle carrier means.

18. An axle suspension for motor vehicles according to claim 15, wherein said second means provides a yieldingness between the axle carrier means and the vehicle superstructure essentially only in a horizontal plane, and including double-jointed shaft means for driving the wheels from said axle gear housing.

19. An axle suspension for motor vehicles according to claim 18, wherein said second means includes rubber bushing means loaded in shear in the axial direction and having an axis extending in the vehicle longitudinal direction for suspending the forward end of said axle carrier means from said vehicle superstructure, rubber ring means having a relatively large diameter and vertical axes for suspending the axle carrier means at two rearward bearing points, said rubber ring means being axially clamped and provided with aperture means, and said third means including two rubber cushion means which are supported in the vehicle longitudinal direction from opposite sides against a part arranged on the vehicle superstructure.

20. An axle suspension for motor vehicles according to claim 18 wherein, said second means further includes a transversely extending support means connected at both ends thereof yieldingly in the the transverse direction for suspending one end of said axle carrier means from the vehicle superstructure and elastic cushion means having a principal yieldingness in the vehicle longitudinal direction for suspending the other end of said axle carrier means from said vehicle superstructure.

said transversely extending support means being constructed in the manner of a leaf spring and producing a yieldingness of the axle carrier means supported thereby in the vehicle longitudinal direction.

21. A axle suspension for motor vehicles according to claim 15, wherein: each of said thrust arm means having an elastic connection with said vehicle superstructure; said swinging axes intersecting at a point generally midway between a vertical plane extending through the wheel centers and a vertical plane extending through said thrust arm means elastic connection.

22. An axle suspension for motor vehicles according to claim 15, wherein said second means includes a connection between said axle carrier means and said vehicle superstructure forward of the intersection of said swinging axes, and a connection between said axle carrier means and said vehicle superstructure rearwardly of the intersection of said swinging axes.

23. An axle suspension for motor vehicles having a superstructure, comprising:
common centrally disposed axle carrier means constituted by the axle gear housing,
axle guide means on both sides of the vehicle, each axle guide means carrying a respective wheel,
first means for suspending said axle guide means to provide swinging axes extending at an angle to the driving direction of the vehicle and operatively connecting said axle guide means with said axle carrier means so as to form an approximately rigid system in an approximately horizontal plane, second means for yieldingly suspending said axle carrier means from said vehicle superstructure, and third means having laterally spaced thrust arms means for elastically supporting the axle guide means on the vehicle superstructure in proximity of the wheels,
said second means providing a yieldingness between the axle carrier means and the vehicle superstructure essentially only in a horizontal plane,
said second means including rubber bushing means stressed in shear in the axial direction thereof and having an axis extending substantially in the vehicle longitudinal direction for suspending the forward end of said axle carrier means from said vehicle superstructure,
said second means further including rubber ring means having a relatively large diameter and substantially vertical axes for suspending the axle carrier means at two rear bearing points, said rubber ring means being clamped in the axial direction and being provided with aperture means,
said third means including two rubber cushion means which are supported in the vehicle longitudinal direction from opposite sides against a part arranged in the vehicle superstructure.

24. An axle suspension for motor vehicles, especially the driven wheels of a motor vehicle having a superstructure, comprising:
common centrally disposed axle carrier means constituted by the axle gear housing,
inclined axle guide means on both sides of the vehicle, each axle guide means carrying a respective wheel and having a swinging axis inclined to the driving direction,
first means operatively connecting said axle guide means with said axle carrier means so as to form an approximately rigid system in an approximately horizontal plane, second means for yieldingly suspending said axle carrier means from said vehicle superstructure, and third means having laterally spaced thrust arm means for elastically supporting the axle guide means on the vehicle superstructure in proximity to the wheels, said second means providing a yieldingness between the axle carrier means and the vehicle superstructure essentially only in a horizontal plane, and double-jointed shaft means for driving wheels from said axle gear housing, said second means including a transversely extending support means connected at both ends thereof yieldingly in the transverse direction for suspending one end of said axle carrier means from the vehicle superstructure and elastic cushion means having a principal yieldingness in the vehicle longitudinal direction for suspending the other end of said axle carrier means from said vehicle superstructure, said transversely extending support means being constructed in the manner of a leaf spring and producing a yieldingness of the axle carrier means supported thereby in the vehicle longitudinal direction.

25. An axle suspension for motor vehicles, especially the driven wheels of a motor vehicle having a superstructure, comprising:

common centrally disposed axle carrier means, axle guide means on both sides of the vehicle, each axle guide carrying a respective wheel, first means providing inclined swinging axes each extending obliquely to the vehicle driving direction from an associated wheel to the oppositely disposed wheel such that said swinging axes intersect a vertical vehicle transverse plane extending through the wheel centers within an area of the oppositely disposed wheel, said first means operatively connecting said axle guide means with said axle carrier means, second means for yieldingly suspending said axle carrier means from said vehicle superstructure for movement substantially only in the vehicle horizontal plane, third means having laterally spaced thrust arm means for elastically supporting said axle guide means on the vehicle superstructure in proximity to the wheels, said first means, said third means and said axle guide means forming a rigid structure in a substantially horizontal plane, said first means providing the sole suspension connection between said axle guide means and said axle carrier means, said second means including a transversely extending support means for supporting said axle carrier means from the vehicle superstructure at the rearward end yieldingly in the transverse vehicle direction and elastic cushion means having a principal yieldingness in the vehicle longitudinal direction for suspending the forward end of said axle carrier means from said vehicle superstructure.

References Cited

UNITED STATES PATENTS

| | | | |
|---|---|---|---|
| 2,968,358 | 1/1961 | DeLorean | 180—73 |
| 3,149,690 | 9/1964 | Rosenbrands et al. | 180—73 |

A. HARRY LEVY, *Primary Examiner.*